(12) United States Patent
Kohno et al.

(10) Patent No.: US 7,570,770 B2
(45) Date of Patent: Aug. 4, 2009

(54) MIXING APPARATUS FOR AUDIO DATA, METHOD OF CONTROLLING THE SAME, AND MIXING CONTROL PROGRAM

(75) Inventors: Akito Kohno, Shizuoka-ken (JP);
Hironari Kobayashi, Shizuoka-ken (JP);
Ryoji Tanji, Shizuoka-ken (JP)

(73) Assignee: Yamaha Corporation, Hamamatsu-Shi (JP)

( * ) Notice: Subject to any disclaimer, the term of this patent is extended or adjusted under 35 U.S.C. 154(b) by 1686 days.

(21) Appl. No.: 09/945,408

(22) Filed: Aug. 30, 2001

(65) Prior Publication Data
US 2002/0025051 A1    Feb. 28, 2002

(30) Foreign Application Priority Data
Aug. 30, 2000  (JP) .............................. 2000-260500

(51) Int. Cl.
*H04B 1/00*     (2006.01)
*H04B 1/20*     (2006.01)
*G06F 17/00*    (2006.01)
*G10H 1/00*     (2006.01)

(52) U.S. Cl. .............................. 381/119; 369/4; 700/94; 84/625; 84/660; 84/610; 84/609

(58) Field of Classification Search ................. 381/119; 369/4; 84/625, 610, 600–609, 615, 660; 700/94; 710/67, 73
See application file for complete search history.

(56) References Cited

U.S. PATENT DOCUMENTS 4,898,059 A  * 2/1990 Iizuka .......................... 84/601
5,300,723 A  * 4/1994 Ito ............................... 84/601
5,668,337 A  * 9/1997 Kondo et al. ................. 84/609
5,831,193 A  * 11/1998 Suzuki et al. ................. 84/603

(Continued)

FOREIGN PATENT DOCUMENTS

JP       08-211863       8/1996

(Continued)

OTHER PUBLICATIONS

Yamaha O2R96 Digital Mixing Console Owner's Manual.*

(Continued)

*Primary Examiner*—Devona Faulk
(74) *Attorney, Agent, or Firm*—Morrison & Foerster LLP

(57) ABSTRACT

There are provided a mixing apparatus that enables a user who is mixing and the like to be positively engaged in the performance of a musical composition at a low cost by simple operations, a method of controlling the same, and a mixing control program. A plurality of first audio data are input, and the input plurality of first audio data are mixed. A storage device stores a plurality of second audio data. A plurality of operating members are each disposed to be depressed and have a sensor for detecting the depression. At least one of the plurality of second audio data stored in the storage device is assigned, respectively, to at least one of the plurality of operating members. The second audio data is reproduced when the at least one of the plurality of operating members to which the second audio data is assigned is detected as being depressed. The second audio data reproduced by the reproducing device is input, and the input second audio data and the input first audio data are mixed.

3 Claims, 10 Drawing Sheets

U.S. PATENT DOCUMENTS

| | | | | |
|---|---|---|---|---|
| 5,902,948 | A * | 5/1999 | Haruyama | 84/609 |
| 5,942,708 | A * | 8/1999 | Yamamoto | 84/604 |
| 6,061,458 | A * | 5/2000 | East et al. | 381/119 |
| 6,198,035 | B1 * | 3/2001 | Saito et al. | 84/617 |
| 6,573,444 | B1 * | 6/2003 | Yamamoto et al. | 84/604 |
| 6,745,351 | B1 | 6/2004 | Mastro | |
| 6,839,441 | B1 * | 1/2005 | Powers et al. | 381/119 |

FOREIGN PATENT DOCUMENTS

| | | | |
|---|---|---|---|
| JP | 10-320194 | | 12/1998 |
| JP | 10320194 | A * | 12/1998 |
| JP | 11-282469 | | 10/1999 |
| JP | 11-327549 | | 11/1999 |
| JP | 2000-112473 | | 4/2000 |
| JP | 2000-163073 | | 6/2000 |
| JP | 2000-214852 | | 8/2000 |

OTHER PUBLICATIONS

Roland. VS-1980 Owner's Manual. 1998 pp. 1,24-26.*

* cited by examiner

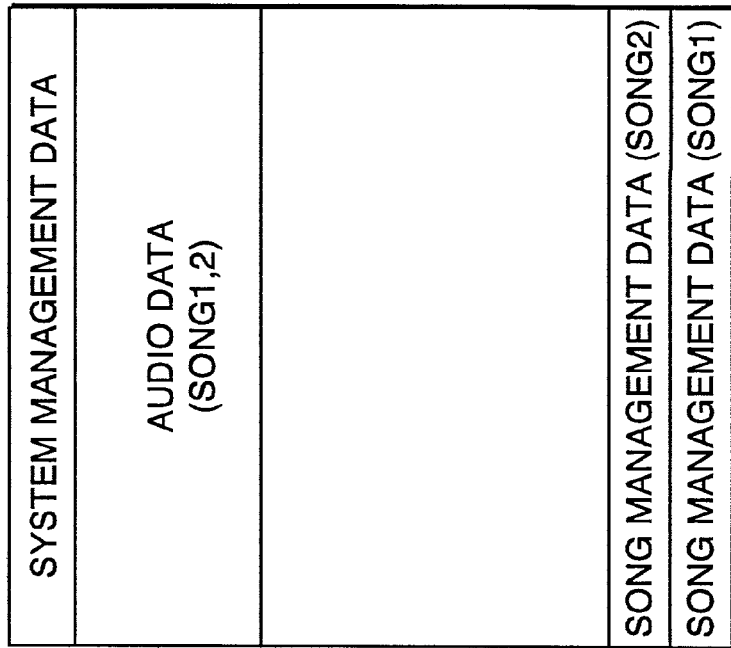
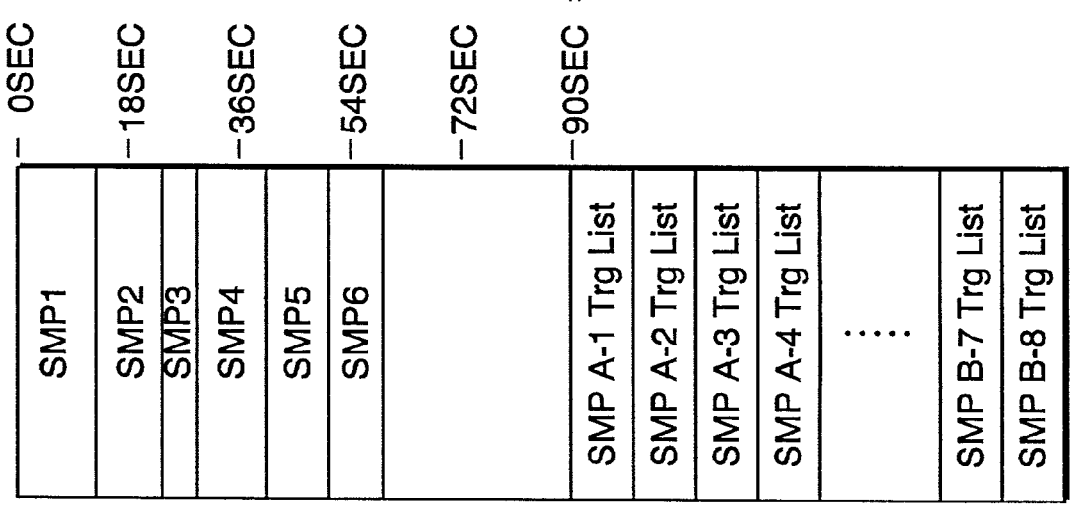

MIXING APPARATUS FOR AUDIO DATA, METHOD OF CONTROLLING THE SAME, AND MIXING CONTROL PROGRAM

BACKGROUND OF THE INVENTION

1. Field of the Invention

This invention relates to a mixing apparatus that mixes audio signals outputted from a plurality of musical instruments and sound equipment, a method of controlling the same, and a mixing control program.

2. Description of the Related Art

Conventionally, a digital mixing apparatus is known which is capable of storing mixed audio data in an external storage device such as a hard disk device (HDD) externally connected to or built in the apparatus and reading out and reproducing the stored audio data.

It has been considered that a user who operates the conventional digital mixing apparatus is never positively engaged in the performance of a musical composition in mixing and recording (hereinafter referred to as "mixing and the like") of audio data, although he or she is engaged in the arrangement of the musical composition by changing a mixing rate of input audio data by means of a fader (volume controller), etc. or by changing parameters of an effecter or the like to change the volume and tone quality of input audio data.

For this reason, the conventional mixing apparatus is not provided with a function for enabling a user to be positively engaged in the performance of a musical composition.

Since a user cannot be positively engaged in the performance of a musical composition physically when using the conventional mixing apparatus as stated above, he or she cannot be satisfied compared to a person who performs a musical instrument.

To insert audio data (waveform data) obtained by performance into a musical composition being subjected to mixing in the conventional mixing apparatus, it is necessary to provide a sampler, a HDD for sample-recording, or the like so as to convert reproduced tones into digital audio data and input them to the mixing apparatus as situation requires. This requires a high cost since there is the need for providing expensive equipment such as a sampler, and requires a lot of efforts since apparatuses other than the mixing apparatus must be provided to convert reproduced tones into digital audio data and store them (i.e. digital recording).

SUMMARY OF THE INVENTION

It is therefore an object of the present invention to provide a mixing apparatus that enables a user who is mixing and the like to be positively engaged in the performance of a musical composition at a low cost by simple operations, a method of controlling the same, and a mixing control program.

To attain the above object, a first aspect of the present invention provides a mixing apparatus comprising an input device that inputs a plurality of first audio data, a mixing device that mixes the input plurality of first audio data, a storage device that stores a plurality of second audio data, a plurality of operating members each being disposed to be depressed and having a sensor for detecting the depression, an assigning device that assigns at least one of the plurality of second audio data stored in the storage device, respectively, to at least one of the plurality of operating members, and a reproducing device that reproduces the second audio data when the at least one of the plurality of operating members to which the second audio data is assigned is detected as being depressed, wherein the input device inputs the second audio data reproduced by the reproducing device, and the mixing device mixes the input second audio data and the input first audio data.

Preferably, at least two of the plurality of operating members are disposed adjacent to each other, and if the second audio data to be assigned is stereo audio data of two channels, the assigning device assigns the stereo audio data of two channels to the two adjacent operating members among the plurality of operating members.

To attain the above object, the first aspect of the present invention further provides a method of controlling a mixing apparatus, comprising an input step of inputting a plurality of first audio data, a mixing step of mixing the input plurality of first audio data a storing step of storing a plurality of second audio data in a storage device, an assigning step of assigning at least one of the plurality of second audio data stored in the storage device, respectively, to at least one of a plurality of operating members each disposed to be depressed and having a sensor for detecting the depression, a reproducing step of reproducing the second audio data when the at least one of the plurality of operating members to which the second audio data is assigned is detected as being depressed, wherein the input step comprises inputting the second audio data reproduced in the reproducing step, and the mixing step comprises mixing the input second audio data and the input first audio data.

To attain the above object, the first aspect of the present invention also provides a mixing control program executed by a computer, the program comprising an input module for inputting a plurality of first audio data, a mixing module for mixing the input plurality of first audio data, a storing module for storing a plurality of second audio data in a storage device, an assigning module for assigning at least one of the plurality of second audio data stored in the storage device, respectively, to at least one of a plurality of operating members each disposed to be depressed and having a sensor for detecting the depression, a reproducing module for reproducing the second audio data when the at least one of the plurality of operating members to which the second audio data is assigned is detected as being depressed, wherein the input module comprises inputting the second audio data reproduced in the reproducing module, and the mixing module comprises mixing the input second audio data and the input first audio data.

To attain the above object, a second aspect of the present invention provides a mixing apparatus comprising an input device that inputs a plurality of first audio data, a mixing device that mixes the input plurality of first audio data, a first storage device that stores a plurality of second audio data, a plurality of operating members each being disposed to be depressed and having a sensor for detecting the depression, an assigning device that assigns at least one of the plurality of second audio data stored in the first storage device, respectively, to at least one of the plurality of operating members, a second storage device, and a first control device that causes the second storage device to temporarily store the assigned second audio data, a reproducing device that reads out and reproduces the second audio data from the second storage device when the at least one of the plurality of operating members to which the second audio data is assigned is detected as being depressed, and a second control device that causes the second storage device to store timing data specifying timing of reading out the second audio data when the reproducing device reproduces the second audio data.

Preferably, the second audio data caused to be stored by the first control device and the timing data caused to be stored by the second control device are stored in separate areas in the second storage device.

To attain the above object, the second aspect of the present invention further provides a method of controlling a mixing apparatus, comprising an input step of inputting a plurality of first audio data, a mixing step of mixing the input plurality of first audio data, a storing step of storing a plurality of second audio data in a first storage device, an assigning step of assigning at least one of the plurality of second audio data stored in the first storage device, respectively, to at least one of a plurality of operating members each disposed to be depressed and having a sensor for detecting the depression, a first controlling step of causing a second storage device to temporarily store the assigned second audio data, a reproducing step of reading out and reproducing the second audio data from the second storage device when the at least one of the plurality of operating members to which the second audio data is assigned is detected as being depressed, and a second controlling step of causing the second storage device to store timing data specifying timing of reading out the second audio data when the second audio data is reproduced in the reproducing step.

To attain the above object, the second aspect of the present invention also provides a mixing control program executed by a computer, the program comprising an input module for inputting a plurality of first audio data, a mixing module for mixing the input plurality of first audio data, a storing module for storing a plurality of second audio data in a first storage device, an assigning module for assigning at least one of the plurality of second audio data stored in the first storage device, respectively, to at least one of a plurality of operating members each disposed to be depressed and having a sensor for detecting the depression, a first controlling module for causing a second storage device to temporarily store the assigned second audio data, a reproducing module for reading out and reproducing the second audio data from the second storage device when the at least one of the plurality of operating members to which the second audio data is assigned is detected as being depressed, and a second controlling module for causing the second storage device to store timing data specifying timing of reading out the second audio data when the second audio data is reproduced in the reproducing module.

To attain the above object, a third aspect of the present invention provides a mixing device comprising an input device that inputs a plurality of first audio data, a built-in hard disk device that stores a plurality of second audio data, an external storage device that stores a plurality of third audio data, a plurality of operating members each being disposed to be depressed and having a sensor for detecting the depression, an assigning device that assigns at least one of the plurality of second audio data stored in the built-in hard disk device and at least one of the plurality of third audio data stored in the external storage device, respectively, to at least one of the plurality of operating members, a memory, a control device that is responsive to the assigning device assigning the third audio data, respectively, to the at least one of the plurality of operating members, for causing the built-in hard disk device to temporarily store the assigned second audio data and causing the memory to store the assigned third audio data, the control device being further responsive to the assigning device assigning the second audio data, respectively, to the at least one of the plurality of operating members, for reading out the assigned second audio data from the built-in hard disk device and causing the memory to temporarily store the assigned second audio data without double storing the assigned second audio data in the built-in hard disk, and a reproducing device that reads out and reproduces the second or third audio data from the memory when the at least one of the plurality of operating members to which the second or third audio data is assigned is detected as being depressed.

In a preferred embodiment, the operating members are pads.

To attain the above object, the third aspect of the present invention provides a method of controlling a mixing device, comprising an input step of inputting a plurality of first audio data, a mixing step of the input plurality of first audio data, a first storing step of storing a plurality of second audio data in a built-in hard disk device, a second storing step of storing a plurality of third audio data in an external storage device, an assigning step of assigning at least one of the plurality of second audio data stored in the built-in hard disk device and at least one of the third audio data stored in the external storage device, respectively, to at least one of a plurality of operating members each disposed to be depressed and having a sensor for detecting the depression, a controlling step of causing, in response to assigning the third audio data, respectively, to the at least one of the plurality of operating members in the assigning step, the built-in hard disk device to temporarily store the assigned second audio data and causing the memory to store the assigned third audio data, and reading out, in response to assigning the second audio data, respectively, to the at least one of the plurality of operating members in the assigning step, the assigned second audio data from the built-in hard disk device and causing the memory to temporarily store the assigned second audio data without double storing the assigned second audio data in the built-in hard disk, and a reproducing step of reading out and reproducing the second or third audio data from the memory when the at least one of the plurality of operating members to which the second or third audio data is assigned is detected as being depressed.

To attain the above object, the third aspect of the present invention also provides a mixing control program executed by a computer, the program comprising an input module for inputting a plurality of first audio data, a mixing module for the input plurality of first audio data, a first storing module for storing a plurality of second audio data in a built-in hard disk device, a second storing module for storing a plurality of third audio data in an external storage device, an assigning module for assigning at least one of the plurality of second audio data stored in the built-in hard disk device and at least one of the third audio data stored in the external storage device, respectively, to at least one of a plurality of operating members each disposed to be depressed and having a sensor for detecting the depression, a controlling module for causing, in response to assigning the third audio data, respectively, to the at least one of the plurality of operating members in the assigning module, the built-in hard disk device to temporarily store the assigned second audio data and causing the memory to store the assigned third audio data, and reading out, in response to assigning the second audio data, respectively, to the at least one of the plurality of operating members in the assigning module, the assigned second audio data from the built-in hard disk device and causing the memory to temporarily store the assigned second audio data without double storing the assigned second audio data in the built-in hard disk, and a reproducing module for reading out and reproducing the second or third audio data from the memory when the at least one of the plurality of operating members to which the second or third audio data is assigned is detected as being depressed.

According to the arrangements of the present invention stated above, the mixing apparatus is provided with a plurality of operating members to which can be assigned audio data stored in the storage device such as an external storage device. Operating the plurality of operating members reproduces the assigned audio data and mixes the reproduced audio data and other input audio data. This enables a user, who is mixing and the like, to be positively engaged in the performance of a musical composition.

Further, the audio data can be assigned directly to the operating members, and this eliminates the need for providing an apparatus such as a sampler and a HDD in addition to the mixing apparatus. This enables a user, who is mixing and the like, to be positively engaged in the performance of a musical composition without requiring a lot of cost and efforts.

Further, arbitrary audio data stored in the external storage device such as a HD and a CD-ROM can be assigned to the operating members, and this provides a variety of sound effects, etc. during the mixing and the like.

Further, the audio data assigned to the respective operating members and the data representing the timing for reproducing the assigned audio data are stored separately from each other. This simplifies the structure of each data and reduces the storage capacity.

The above and other objects of the invention will become more apparent from the following drawings taken in conjunction with the accompanying drawings.

BRIEF DESCRIPTION OF THE DRAWINGS

FIG. 10A is a diagram showing an example of the whole memory map in a pad RAM in FIG. 1;

FIG. 10B is a diagram showing an example of a memory map in a part of a HDD of the HD recorder;

DETAILED DESCRIPTION OF THE PREFERRED EMBODIMENTS

The present invention will hereunder be described in detail with reference to the accompanying drawings showing a preferred embodiment thereof.

Figure 1:
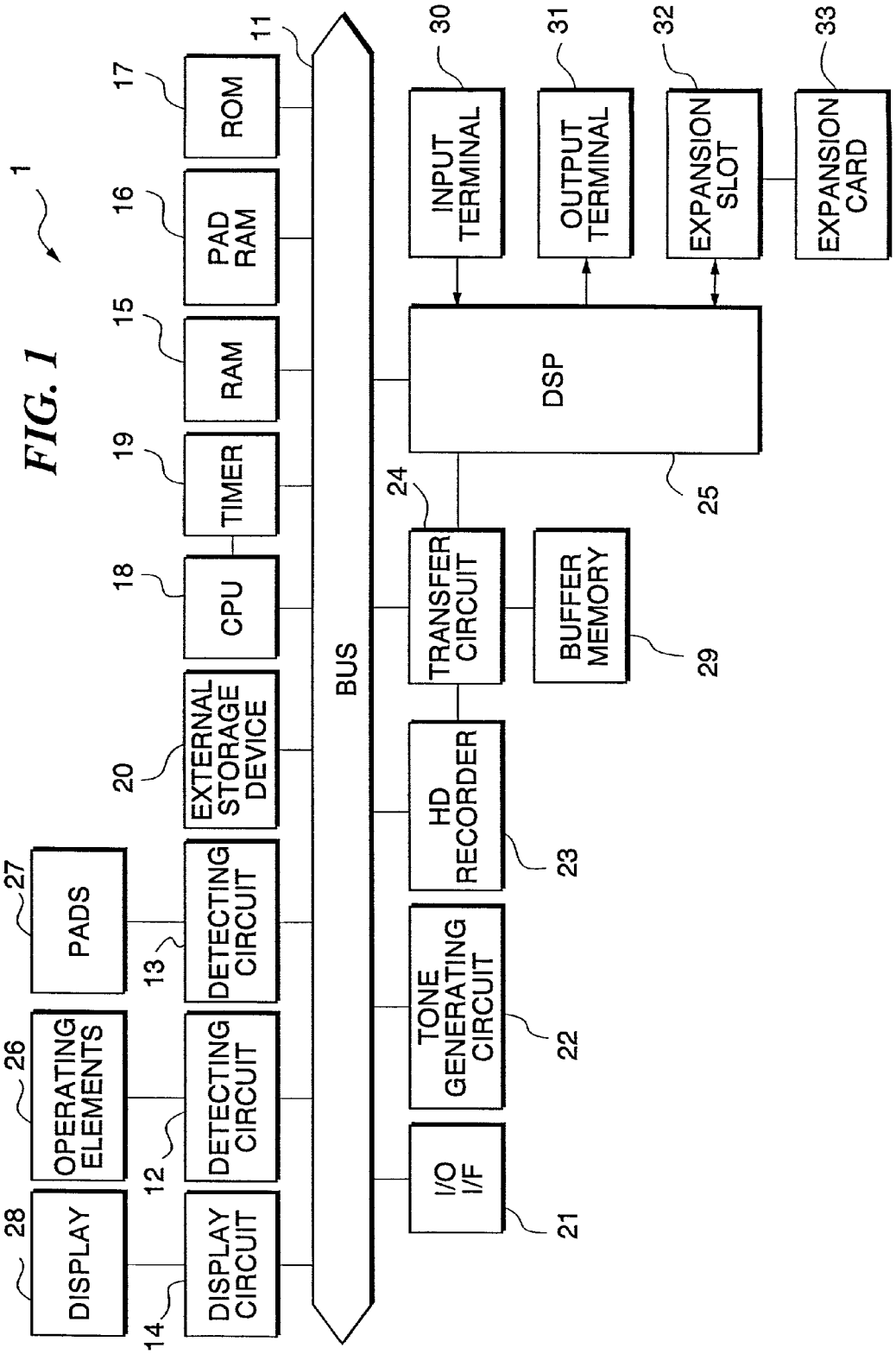
FIG. 1 is a schematic block diagram showing the construction of a mixing apparatus according to an embodiment of the present invention.

FIG. 1 is a schematic block diagram showing the construction of a mixing apparatus 1 according to an embodiment of the present invention.

As shown in FIG. 1, there are connected to a bus 11 detecting circuits 12 and 13, a display circuit 14, a RAM 15, a pad RAM 16, a ROM 17, a CPU 18, a timer 19, an external storage device 20, an IN/OUT (I/O) interface (I/F) 21, a tone generator circuit 22, a hard disk recorder (HD recorder) 23, a transfer circuit 24, and a digital sound processor (DSP) 25.

A plurality of operating elements 26 are connected to the detecting circuit 12. A user can input a variety of information relating to equalizing, the setup for providing effects, the volume control, the setup for a mixing process, a variety of parameters, the input and selection of presetting, and the like via the operating elements 26. It is possible to use any types of operating elements such as a jog shuttle, a rotary encoder, a fader, a slider, a mouse, a keyboard, a joystick, and a switch, insofar as they are capable of generating an optimum signal according to information that should be input.

A plurality (eight in this embodiment) of pads (operating members) 27 are connected to the detecting circuit 13. Ordinary ON/OFF switches that output an ON/OFF signal in response to the depression by a user's finger may be used as the pads 27, and therefore a description of the structure thereof is omitted here. Preferably, a press section of the pad 27 is formed as a switch made of a semicylindrical elastic material with high durability so as to prevent the pad 27 from being broken by repeated depressions.

According to the present embodiment, each pad 27 is divided into two banks, so that two kinds of audio data can be assigned to each pad 27 by switching between two banks as described later in further detail. Thus, according to the present embodiment, sixteen kinds of audio data can be assigned to all the pads 27. Each pad 27 outputs an ON signal while a user is depressing it, and the CPU 18 reproduces audio data assigned to the pad 27 in response to the ON signal. The audio data assigned to each pad 27 is normally shorter than a performance period of a musical composition that is being subjected to mixing and the like. A period of time the pad 27 is operated may be longer than the time required for recording the assigned audio data. In this case, the reproduction of the audio data is terminated in the middle of the musical composition. Conversely, if a period of time the pad 27 is operated is shorter than the time required for recording the assigned audio data, the reproduction of the audio data is terminated in the middle of the audio data without the whole audio data being reproduced. When the pad 27 is operated again, the audio data is reproduced from the beginning.

It should be noted that a sensor such as a piezo-element capable of detecting the degree of depression may be used instead of the ordinary ON/OFF switch as the pad 27. In this case, the pad 27 outputs a signal with a value corresponding to the degree or force of depression of a user, and it is therefore possible to change the volume of reproduced tones and the like in addition to the reproduction of the assigned data.

It should be noted that the pads 27 may be included in the operating elements 26 since they are a sort of operating elements. According to the present invention, however, the pads 27 are provided separately from the operating elements 26 since the present invention is also characterized by providing the mixing apparatus with the pads 27 for assigning audio data.

The display circuit 14 is connected to a display 28 so that a variety of information relating to the assignment of channels, the equalizing of respective channels, the setup for providing effects, the volume control, and so forth can be shown on the display 28 under control of the display circuit 14. For example, the display 28 is comprised of a liquid crystal display (LCD) or a light-emitting diode (LED), but it should be understood that there is no intention to limit the present invention to it. It is possible to use any types of displays insofar as they are capable of displaying a variety of information.

The RAM 15 is provided with a register, a buffer and a work area that temporarily store performance data, a variety of input information, the results of calculations, and so forth.

The pad RAM 16 temporarily stores audio data assigned to the respective pads 27, and temporarily stores information indicating operation timing in which a user operates the pads 27 to reproduce the assigned audio data as a musical composition progresses. The pad RAM 16 may be formed as a part of the RAM 15.

The ROM 17 contains a control program executed by the CPU 18, a variety of table data, and so forth.

The CPU 18 performs operations and the like according to the control program stored in the ROM 17 or the external storage device 20.

The timer 19 is connected to the CPU 18. The timer 19 outputs a basic clock signal, an interruption signal indicating the timing of interruption, and the like to the CPU 18.

The external storage device 20 includes an interface for external storage, and is connected to the bus 11 via the interface. Examples of the external storage device 20 are a CD-RW drive, a semiconductor memory such as a flash memory, a floppy disk drive (FDD), a hard disk drive (HDD), a magneto-optical disk (MO) drive, a compact disk-read only memory (CD-ROM) drive, and a DVD (Digital Versatile Disk) drive.

According to the present embodiment, a HDD and a CD-RW drive are used as the external storage device 20. For example, the HDD is connected to the bus 11 via an SCSI (Small Computer System Interface) as the interface. It goes without saying that there is no intention to limit the interface to it. A variety of information can be stored in the CD-RW drive. A user can produce a music CD by tracking down audio signals on multiple tracks recorded in the HD recorder 23 into normal stereo digital audio signals. Further, a common HDD may be used as the external storage device 20 and the HD recorder 23 described later.

The I/O interface (I/F) 21 is used to connect an electronic musical instrument, anther sound equipment, a computer, an expanded HDD and the like to the mixing apparatus 1. According to the present embodiment, the I/O interface (I/F) 21 is, for example, an MIDI (Musical Instrument Digital Interface), the SCSI, RS-232C interface, a USB (Universal Serial Bus), a universal interface based on the IEEE 1394 standard.

The tone generator circuit 22 generates an audio signal according to the input MIDI signal, etc. and supplies it to the DSP 25, etc. via the bus 11.

The tone generator circuit 22 may be any type; e.g. a waveform memory system, an FM system, a physical model system, harmonic synthesizing system, a formant synthesizing system, an analog synthesizer system comprised of a VCO (Voltage Controlled Oscillator), a VCF (Voltage Controlled Filter) and a VCA (Voltage Controlled Amplifier).

It should be understood that the tone generator circuit 22 should not necessarily be comprised of special hardware. For example, the tone generator circuit 22 may be comprised of either the DSP and a microprogram or the CPU and software.

Further, one tone generator circuit may be used in a time-sharing manner to form a plurality of sounding channels, or a plurality of tone generator circuits may be used to form a plurality of sounding channels such that each of sounding channels is provided with one tone generator circuit.

The HD recorder 23 is comprised of a hard disk drive (HDD) that is capable of recording digital audio signals separately or simultaneously on a plurality of tracks (sixteen tracks in this embodiment) at a resolution of 16 bits (or 24 bits) and 44.1 kHz (or 48 kHz).

The buffer memory 29 is connected to the transfer circuit 24. The transfer circuit 24 transfers data (audio data) between the HD recorder 23 and the buffer memory 29 and between the DSP 25 and the buffer memory 29 in accordance with instructions from the CPU 18.

For example, to record data on a certain track of the HD recorder 23, the transfer circuit 24 receives digital data (audio data) of one sample from the DSP 25 and writes it to the buffer memory 29 in a predetermined sampling cycle (e.g. 44.1 kHz). The transfer circuit 24 repeats the writing of the digital data to the buffer memory 20. If one cluster of data has been written to the buffer memory 29, the data is sequentially written in a storage area in a corresponding track of the HD recorder 23. While the data is written to the HD recorder 23, the transfer circuit 24 continues writing the data received from the DSP 25 onto the buffer memory 29. The data is recorded by continuing the above operations.

For example, to reproduce data on a certain track of the HD recorder 23, the transfer circuit 24 reads out two clusters of data at the top of the storage area on the track of the HD recorder 23 onto the buffer memory 29. Then, the transfer circuit 24 reads out one sample of digital data from the buffer memory 29 in a predetermined sampling cycle and outputs the readout data to the DSP 25. Every time a space area of one cluster is formed in the buffer memory 29, one subsequent cluster of data is sequentially read out from the storage area on the track of the HD recorder 23, thus performing reproduction.

The DSP 25 performs various processing operations such as a mixing operation for a digital audio signal (data) supplied from any of a plurality of input terminals 30 or from the HD recorder 23 through the transfer circuit 24. The DSP 25 then outputs the digital audio signal (data) to a plurality of output terminals 31. The DSP 25 is also provided with an expansion slot for increasing the number of input and output terminals. An expansion card 33 for adding input and output terminals can be inserted into the expansion slot 32.

The input terminals 30 are each provided with an A/D converter (ADC), not shown, which converts an analog audio signal into a digital audio signal, and the output terminals 30 are each provided with a D/A converter (DAC), not shown, which converts a digital audio signal into an analog audio signal. The expansion card 33 is provided with both an ADC and a DAC.

Figure 2:
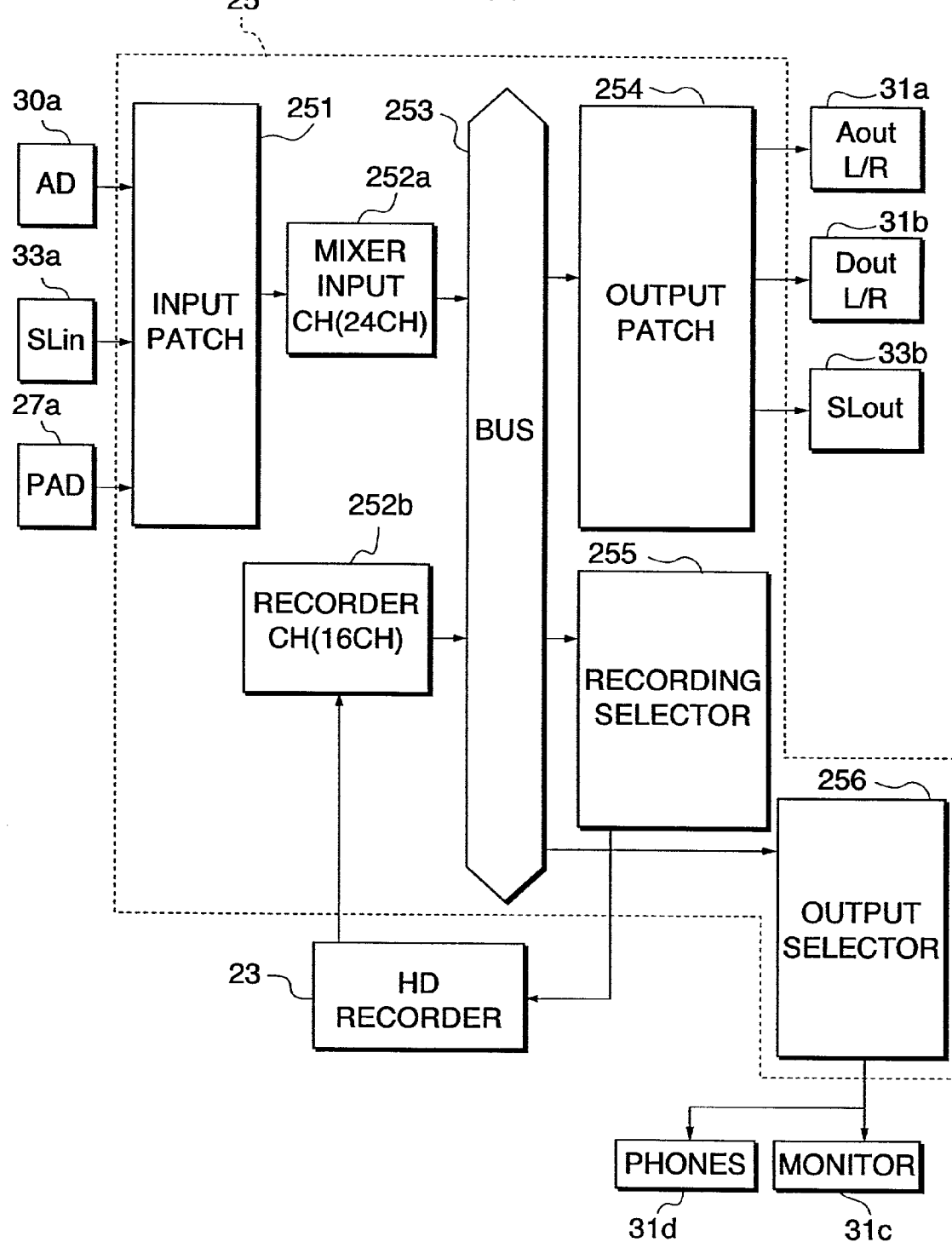
FIG. 2 is a block diagram showing the functions of a DSP appearing in FIG. 1.

FIG. 2 is a block diagram showing the functions of the DSP 25 in FIG. 1, and parts similar to those described with reference to FIG. 1 are denoted by the same reference numerals. In FIG. 2, each block represents a function, and most of the functions are not implemented by hardware but are implemented by a CPU (or MPU) and a microprogram, not shown, which are provided in the DSP 25. Of course, the functions may be implemented by hardware insofar as there is no necessity of reducing the cost or making design changes easier.

As shown in FIG. 2, the DSP 25 is comprised of an input patch 251, a mixer input 252a (MIXER INPUT) with twenty-four channels (ch), a recorder input 252b (RECORDER) with sixteen channels, a bus 253, an output patch 254, a recording selector 255, and an output selector 256.

The input patch 251 assigns respective ones of multiple audio signals input from an input AD 30a, an input SLin 33a, an input pad 27a, etc. to any input channel among twenty-four channels of the mixer input 252a.

The input AD 30a is used to input analog sounds of channels 1 to 8 through the ADCs of the input terminals 30. The input SLin 33a is used to input a digital or analog audio signal supplied from the expansion card 33 inserted into the expansion slot 32 in FIG. 1. The input pad 27a is used to input audio data assigned to the pads 27. The input pad 27a may also input an audio signal outputted from the tone generator circuit 22.

The mixer input 252a performs various processing operations such as an equalizing operation and a volume controlling operation for the audio signals inputted to the respective channels, and then outputs the audio signals to the bus 253.

The recorder input 252b assigns audio signals (data) of sixteen tracks in the HD recorder 23 to corresponding ones of channels 1 to 16. The recorder input 252b then performs various processing operations such as an equalizing operation and a volume controlling operation for the audio signals (data) inputted to the respective channels and outputs them to the bus 253.

The bus 253 is comprised of buses B1-B8, a stereo bus ST, and so forth. The buses B1-B8 are used in mixing audio signals inputted to the respective buses and outputting the mixed signals to the output patch 254 and the recording selector 255. The stereo bus ST is used in mixing audio signals for the left channels (Lch) and the right channels (Rch), which are inputted from the mixer input 252a or the recorder input 252b, and outputting the mixed signals as stereo sounds to the output patch 254, the recording selector 255 and the output selector 256.

The output patch 254 assigns the audio signals supplied from the buses B1-B8 and the stereo bus ST to any one of a stereo analog sound output (Aout L/R) 31a, a stereo digital sound output (Dout L/R) and an output Slout 33b. The output Slout 33b is a digital or analog sound output from the expansion card 33 inserted into the expansion slot 32.

The recording selector 255 assigns monophonic or stereo sound outputs from the buses B1 to B8, the stereo bus ST, etc. to the corresponding tracks of the HD recorder 23.

The output selector 256 outputs the stereo sound outputs from the stereo bus ST and the like to a monitor output terminal (monitor) 31c or a headphone output terminal (phones) 31d.

Figure 3:
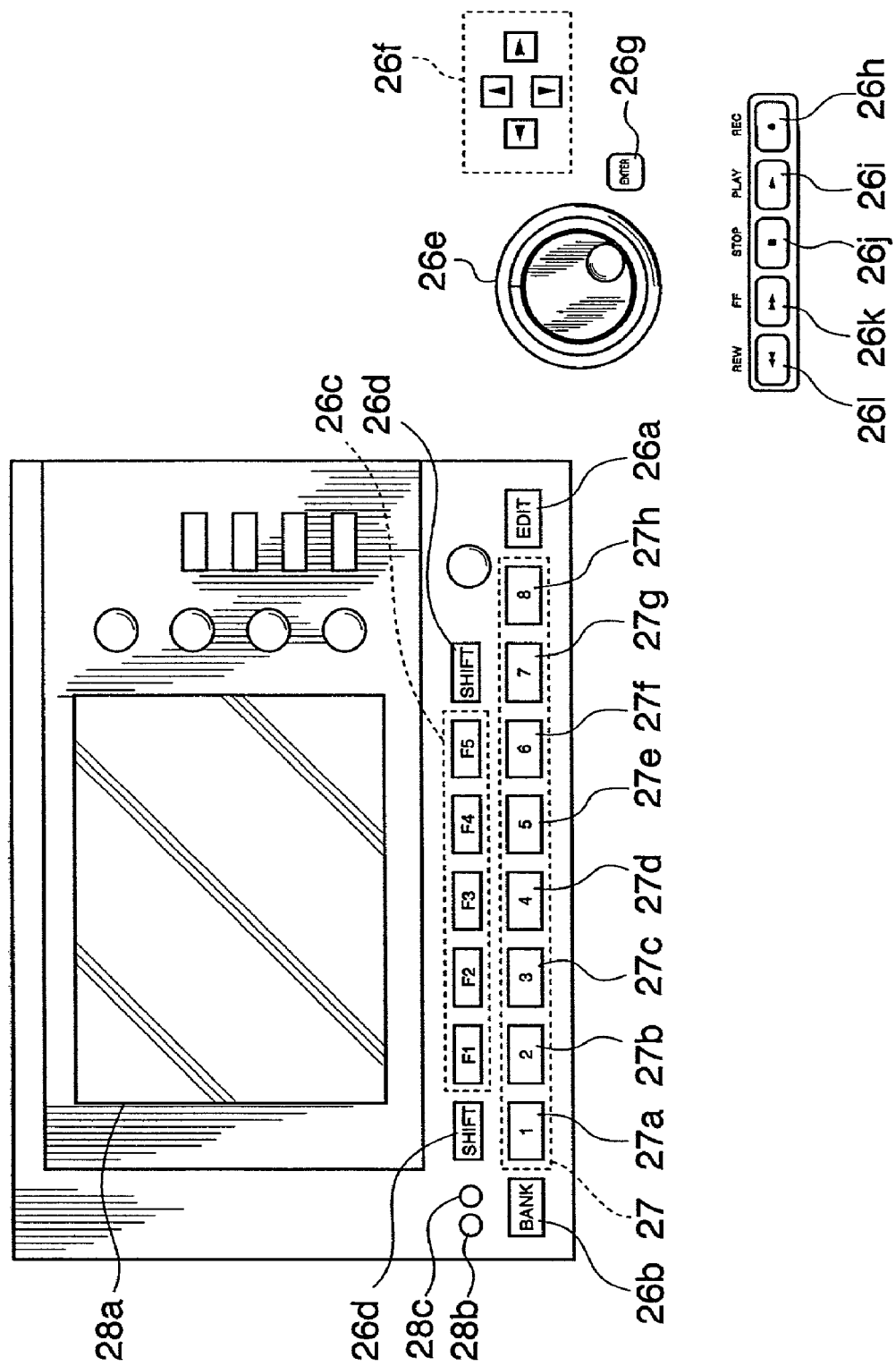
FIG. 3 is a diagram showing necessary components for explaining the embodiment among components of a front panel of the mixing apparatus in FIG. 1.

FIG. 3 shows necessary components for explaining the present embodiment among components of a front panel of the mixing apparatus 1. The front panel of the mixing apparatus 1 is comprised of the operating elements 26, the pads 27, and the displays 28. There are shown in FIG. 3 an edit (EDIT) key 26a, a bank (BANK) key 26b, five function keys 26c, two shift (SHIFT) keys 26d, a jog shuttle 26e, four cursor shift keys 26f, an enter (ENTER) key 26g, a recording (REC) key 26h, a playback (PLAY) key 26i, a stop (STOP) key 26j, a fast-forwarding (FF) key 26k, and a rewinding (RW) key 261 as the operating members 26; eight pads 27a-27h as the pads 27; and a LCD 28a and two LEDs 28b, 28c as the displays 28.

The LEDs 28b and 28c are lighted correspondingly to a bank A and a bank B, respectively. According to the present embodiment, two kinds of audio data can be assigned to each of pads 27a-27h by switching the bank between the two banks using the bank key 26b as described later. In the reproduction of the audio data, eight tones (audio data) can be sounded at the same time. Therefore, a user needs to know which bank is currently designated in the reproduction, and accordingly, either one of the LEDs 28b and 28c is lighted to inform the user of the currently designated bank.

The respective functions assigned to the operating elements 26a to 26l, the pads 27a-27h and the displays 28a-28c will be described later in detail.

Referring next to FIGS. 4-10, a detailed description will be given of a controlling operation carried out by the mixing apparatus 1 constructed in the above mentioned manner. Prior to this description, there will be described principal functions of the mixing apparatus 1, which constitute features the present invention.

The mixing apparatus 1 has the following functions:

1) an audio data assigning function of assigning audio data to the respective pads 27;

2) a channel assigning function of assigning each of the pads 27 to any one of twenty four channels of the mixer input 252a and/or any one of sixteen channels of the recording selector 255;

3) a pad editing function of editing the setting of each pad 27; and 4) a recording and reproducing function of recording and reproducing an operating condition of each pad 27.

A detailed description will hereunder be given of a controlling operation for executing the above functions in irregular order.

Figure 4:
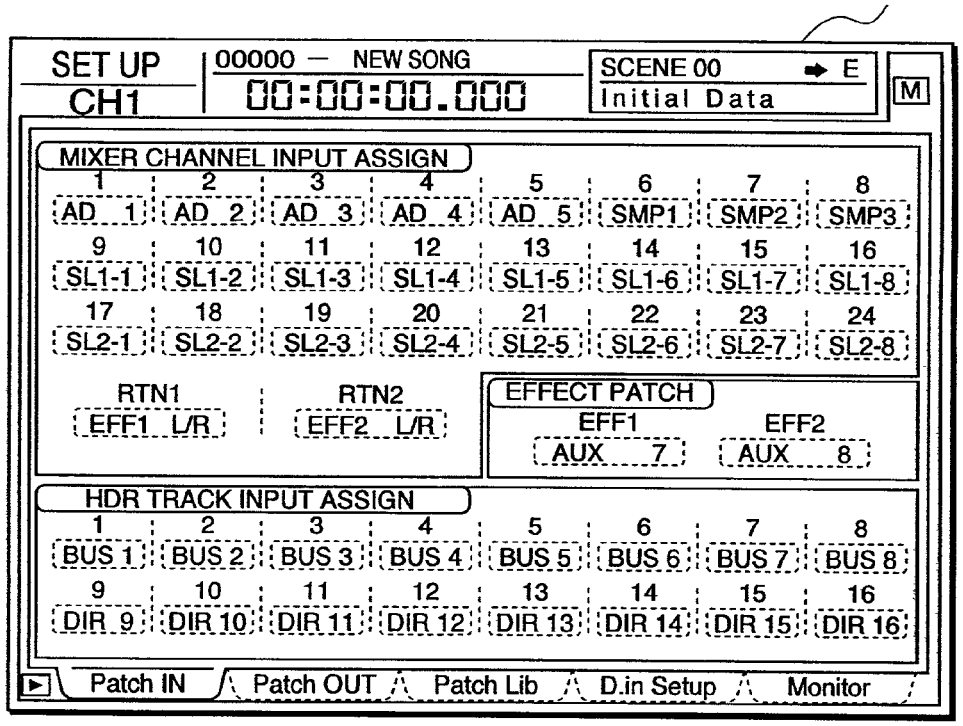
FIG. 4 is a view showing a channel assigning function of the mixing apparatus.

FIG. 4 is a view useful in explaining the channel assigning function of the mixing apparatus 1 as stated above in (2). FIG. 4 shows an example of a display when a patch-in mode is started by operating a selection key that is not illustrated.

Referring to FIG. 4, the cursor shift key 26f is operated to move a cursor into an area "MIXER CHANNEL INPUT ASSIGNE". In this area, it is possible to set up the input patch 251, in other words, it is possible to perform a setting operation for setting which input is assigned to which channel of the mixer input 252a. A description will hereunder be given, by way of example, of the setting operation for assigning the pads 27a-27c to the channels 6-8 of the mixer input 252a.

When the cursor is set to a position of a channel ("6" (ch)) in the area "MIXER CHANNEL INPUT ASSIGNE" and the jog shuttle 26e is rotated, the name of an input signal assigned to the channel 6 is sequentially changed over to be displayed. When a desired name ("SMP1" (the pad 27a)) is displayed, a user stops operating the jog shuttle 26e and presses the enter key 26g. The user then moves the cursor to a position of a channel ("7" (ch)) to which an input signal should be assigned next, and repeats the same operation. Further, the user moves the cursor to the position of a channel ("8" (ch)) to which an input signal should be assigned next, and repeats the same operation. The position of the cursor may be shown by inverting, but it should be understood that there is no intention to limit the present invention to it. The position of the cursor may be displayed in any forms insofar as a user can recognize it.

By performing the above operations, the pads 27a-27c can be assigned to the channels 6-8 of the mixer input 252a.

In the patch-in mode, the recording selector 255 is set up, that is, signals to be assigned to the respective ones of sixteen tracks in the HD recorder 23 can be set. Specifically, the cursor is set to a track position in an area "HDR TRACK INPUT ASSIGN" and the jog shuttle 26e is rotated in order to assign the signals to the respective tracks of the HD recorder 23 as is the case with the setup of the input batch 251. In the illustrated example, the buses 6-8 are assigned to the tracks 6-8. Since names SMP 1-3 (the pads 27a-27c) have been assigned to the channels 6-8 of the mixer input 252a in the setup of the input patch 251, the channels 6-8 are assigned to the buses 6-8 to store audio signals assigned to the pads 27a-27c on the corresponding tracks of the HC recorder 23 according to the operations of the pads 27a-27c.

Figure 5:
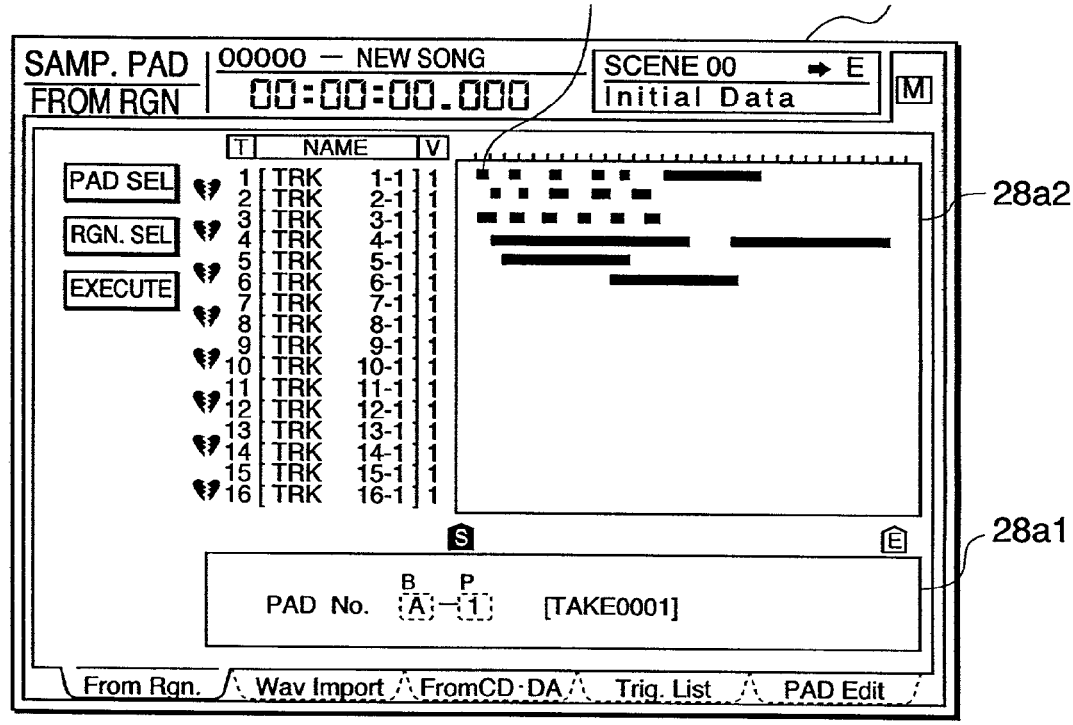
FIG. 5 is a view showing an example of a setup screen for use in assigning a certain region in a certain track recorded in an HD recorder appearing in FIG. 1 to any one of pads.
Figure 6:
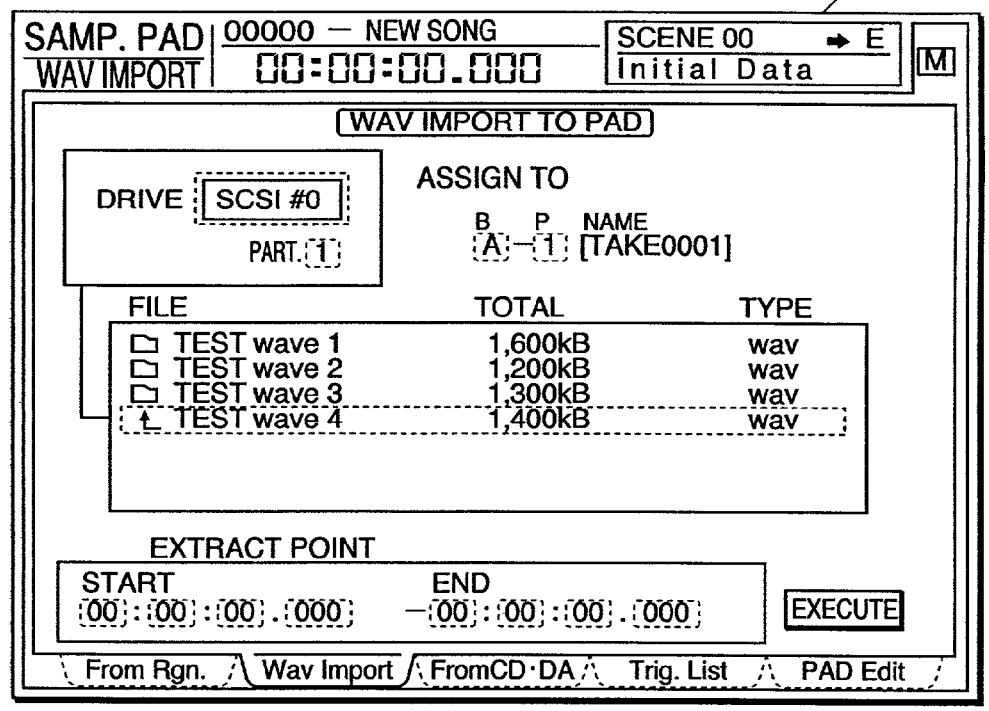
FIG. 6 is a view showing an example of a setup screen for use in assigning a waveform data file stored in a HDD of an external storage device in FIG. 1 to any one of the pads.
Figure 7:
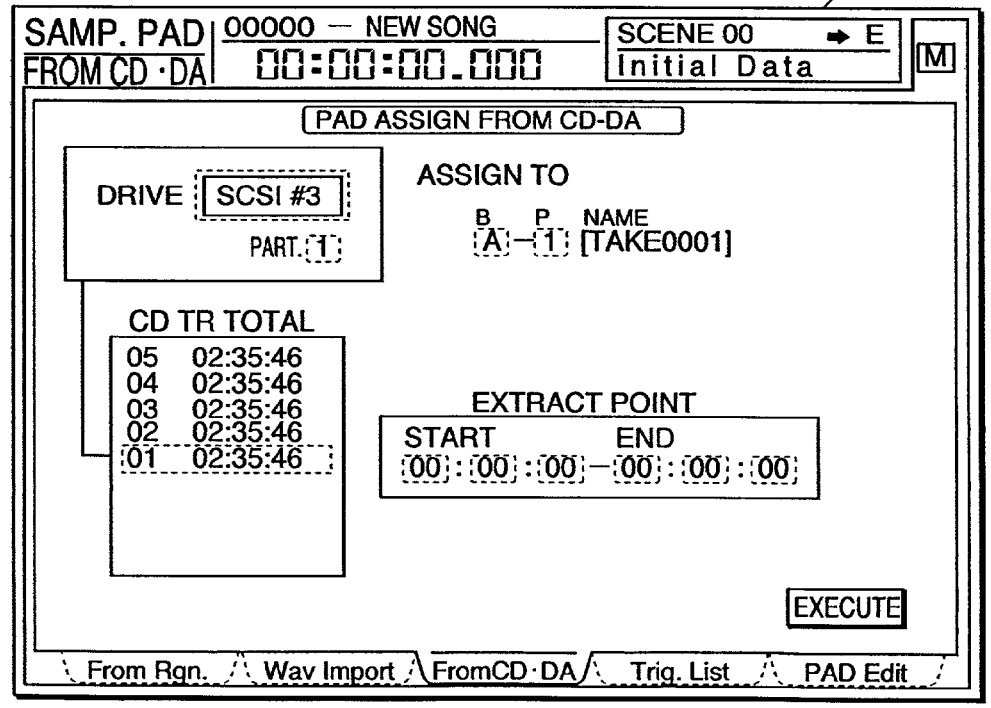
FIG. 7 is a view showing an example of a setup screen for use in assigning a waveform data file stored in a CD-ROM inserted into a CD-RW drive as the external storage device appearing in FIG. 1 to any one of the pads.

FIGS. 5-7 are views useful in explaining the audio data editing function as stated above in (1). It should be noted that a setup screen for assigning the audio data, recording/reproducing the operating conditions of the pads, and the like is displayed by operating the edit key 26a in FIG. 3.

FIG. 5 shows an example of a setup screen ("FROM RGN.") for assigning a certain region in a certain track recorded in the HD recorder 23 to any one of the pads 27. The last setup screen is shifted to this setup screen by operating the edit key 26a and then operating the first key ("F1") among the function keys 26c (or by setting the cursor to a tag "From Rgn." on the screen and pressing the enter key 26g).

Referring to FIG. 5, the cursor shift key 26f is operated first to set the cursor to a button "PAD SEL", and the enter key 26g is then pressed. This inverts the display of the button "PAD SEL" (not shown), and displays a selection area 28a1 for designating one of the pads 27 at the lower section of the screen. The pad 27a of a pad number (P) "1" in the bank (B) "A" is displayed as a default. Thus, when a user would like to select another pad 27, he or she sets the cursor to a position where the bank or the pad number is displayed and rotates the jog shuttle 26e to select the desired pad 27. It should be noted that the pads 27 are provided with respective names for each take (a unit of recording: one take (TAKE)=one recording). In the illustrated example, the pad 27a in the bank A is provided with a name "TAKE0001". The names can be changed in a pad editing mode ("PAD EDIT") as described later.

Next, the cursor shift key 26f is operated to set the cursor to a button "RGN. SEL", and the enter key 26g is pressed. This inverts the display of the button "RGN. SEL" (not shown), and shifts the cursor to the position of a first region r in a region display area 28a2. By operating the cursor shift key 26f in this state, it is possible to designate a region (a target region) that should be assigned to the selected pad 27. Here, the region means audio data in an area where reproduction information (e.g. which area in which sound file should be reproduced) on a track is attached to a sound file (a file of audio data generated by recording (sampling) audio data on a certain track).

If the desired region has been designated, the cursor is set to a button "EXECUTE", and the enter key 26g is pressed to assign the target region to the pad 27 of the designated number in the designated bank. More specifically, a sound file indicated by the desired region (or a part of a sound file if the part is indicated by the desired region) is read out from a corresponding storage location in the HDD of the HD recorder 23 and is stored at a corresponding location in the pad RAM 16. A method of storing the data read out from the HDD in the pad RAM 16 will be described later with reference to FIG. 10.

FIG. 6 shows an example of a setup screen ("WAV IMPORT") for assigning a waveform data file stored in the HDD of the external storage device 20 to any one of the pads 27. The last setup screen is shifted to this setup screen by pressing the second key ("F2") among the function keys 26c on the setup screen in FIG. 5 (or by setting the cursor to a tag "Wav Import" on the screen and pressing the enter key 26g).

Referring to FIG. 6, the cursor shift key 26f is operated first to set the cursor to a position "DRIVE", and the jug shuttle 26e is then operated to determine a drive including a waveform data file that should assigned to the pad 27. It should be noted that it is unnecessary to operate the jog shuttle 26e according to the present embodiment because the HDD is set as a drive with an SCSI ID number "0" and a drive displayed as a default has an ID number "0". If, however, a desired drive does not necessarily have an ID number displayed as a default, it is necessary to operate the jog shuttle 26e to select a target drive.

If the desired drive, i.e. the HDD has been selected as stated above, a list of the names of the waveform data files therein is displayed together with the data size (TOTAL) and the data format (TYPE). A desired file is selected from the list.

A partial area to be assigned is then designated in the selected waveform data file. Specifically, the cursor is set to a position "START" or "END" in an area "EXTRACT POINT", and the top and end of the area are indicated in time (for example, the maximum unit is a "second").

The partial area of the waveform data file designated in the above-mentioned manner is assigned to any one of the pads 27. The assigning method is the same as the above described region assigning method, and therefore a description thereof is omitted here.

If the assignment of all the waveform data files is completed by repeating the above sequence of operations, the assignment is confirmed by setting the cursor to the button "EXECUTE" and pressing the enter key 26g.

If the waveform data files have been newly assigned as stated above, the waveform data files are read out from the HDD of the external storage device 20 and stored at corresponding locations in the pad RAM 16 as well as in a predetermined area in the HDD of the HD recorder 23.

FIG. 7 shows an example of a setup screen ("FROM CD_DA") for assigning a waveform data file stored in a CD-ROM inserted into the CD-RW drive of the external storage device 20 to any one of the pads 27. The last setup screen is shifted to this setup screen by pressing the third key ("F3") among the function keys 26c on the setup screen in FIG. 5 or 6 (or by setting the cursor to a "From CD_DA" tag and pressing the enter key 26g).

The setup screen in FIG. 7 is different from the one in FIG. 6 only in the following two points: (1) the ID number of the CD-RW drive is "3", and (2) waveform data files are indicated in time, not in size. These differences will only be described hereinbelow.

As for the difference (1), the CD-RW drive is set as a drive with the SCSI ID number "3" according to the present embodiment. However, it is unnecessary to change the drive if the drive with the ID number "3" is predetermined to be displayed as a default in the case where a "FROM CD_DA" mode is selected.

The difference (2) is made because the data stored in the CD-ROM and the data stored in the HDD are in different formats. According to the present embodiment, a partial area of a waveform data file is designated in time, and therefore, the setup is considered to be easier if the waveform data files are displayed in time.

If the waveform data file has been newly assigned as stated above, the waveform data file is read our from the CD-ROM inserted into the CD-RW drive and is stored in a predetermined area in the HDD of the HD recorder 23 and at a corresponding location in the pad RAM 16.

Figure 8:
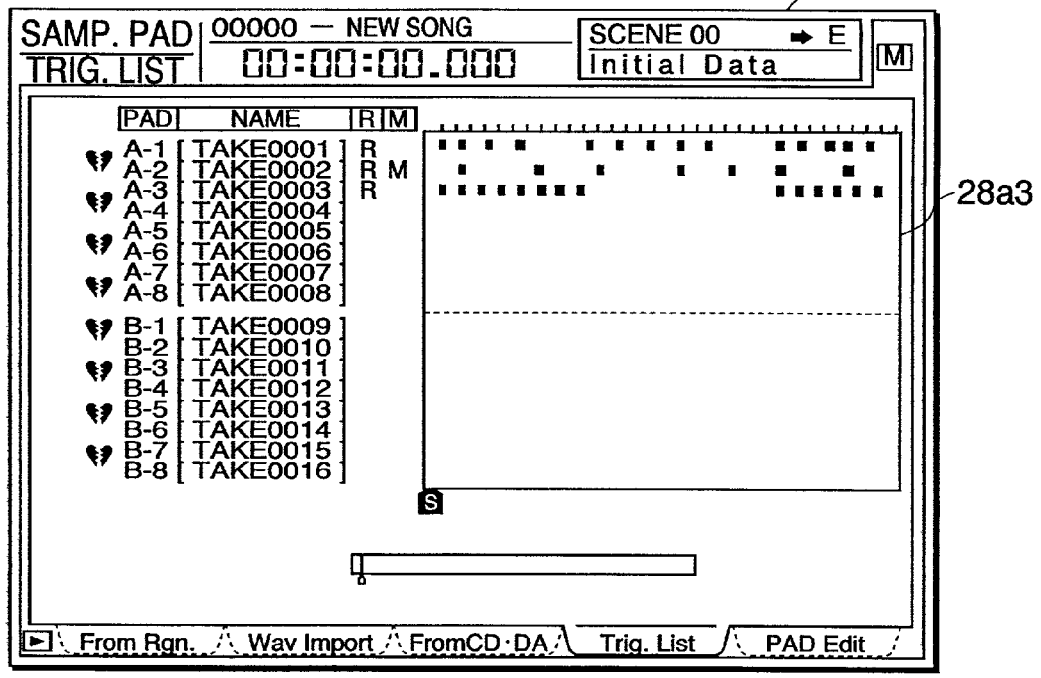
FIG. 8 is a view useful in explaining a recording/reproducing function.

FIG. 8 is a view useful in explaining the recording/reproducing function as stated above in (4). The last setup screen is shifted to a setup screen in FIG. 8 ("TRIG. LIST") by pressing the fourth key ("F4") among the function keys 26c on the setup screen in FIG. 5, 6 or 7 (or by setting the cursor to a "Trig. List" tag on the screen).

Referring to FIG. 8, eight pads 27 for each of the banks "A", "B" (a total of sixteen pads A-1 to B-8), the names thereof ("NAME"; TAKE0001-TAKE0016), and a region display area 28a3 are displayed on the setup screen. On the setup screen in FIG. 8, "TRIG. LIST" (Trigger List) means a sequence of regions per track. A region shown in the region display area 28a3 is different from the region shown in the region display area 28a2 in FIG. 5 in that the region shown in the region display area 28a3 shows operational information (time) on an operation (time) from the depression of the corresponding pad 27 to the release thereof.

To produce a trigger list, i.e. record the operational information on each pad 27, the cursor is set to a position "R" of a desired pad 27 and the enter key 26g is pressed. Every time the enter key 26g is pressed, the character "R" is repeatedly lighted up and out by toggling. The light-up of the character "R" indicates that the recording is possible, whereas the light-out of the character "R" indicates that the recording is impossible. In the illustrated example, the characters "R" are lighted up at the positions of the pads 27a 27c(A-1-A-3) in the bank "A", and this indicates that it is possible to generate the trigger list of the pads 27a-27c.

On this occasion, pressing the REC key 26 starts recording the operating conditions of the pads 27a-27c so that the operating conditions are recorded as the sequence of regions as shown in FIG. 8. The trigger list of the pad 27 is recorded and reproduced at the same time as the recording and reproduction of the HD recorder 23.

Pressing the PLAY key 26i causes the reproduction of the recorded trigger list. It may be set such that tones reproduced by reproduction of some trigger lists are inhibited from being outputted. Specifically, the cursor is set to a position "M" of the pad 27 for which the trigger list has been generated, and the enter key 26g is then pressed. Every time the enter key 26g is pressed, a character "M" is repeatedly lighted up and out by toggling. The light-up of the character "M" indicates a muting state, whereas the light-out of the character "M" indicates a non-muting state. In the illustrated example, the character "M" is lighted up at the position of the second pad 27b in the bank "A", and when the trigger list of this pad 27b is reproduced such that the reproduced tones thereof are inhibited from being outputted.

Referring next to FIGS. 10A and 10B, there will be described the method of storing audio data assigned to the respective pads 27 and trigger lists corresponding to the respective pads 27 in the pad RAM 16.

FIG. 10A shows an example of a memory map of the entire pad RAM in FIG. 1, and FIG. 10B shows an example of a memory map of a partial area in the HDD of the HD recorder.

As shown in FIG. 10A, the pad RAM 16 is comprised of areas with a fixed capacity for storing the audio data assigned to the respective pads 27, and areas with a fixed capacity for storing the trigger lists corresponding to the respective pads 27. All the areas for storing the audio data have a capacity for storing audio data of 90 seconds with a data length of 16 bits and a sampling frequency of 44.1 kHz. The trigger lists are stored in the other areas of the pad RAM 16. The capacity of each trigger list is much smaller than the capacity of each audio data. In the illustrated example, however, the areas for storing the audio data and the areas for storing the trigger lists are displayed in a scale having the same capacity because this is convenient for explanation.

The purpose of separating the areas for storing the audio data from the areas for storing the trigger lists is to simplify the structures of the audio data and the trigger lists.

As stated above, if the audio data to be assigned to the respective pads 27 are not stored in the HDD of the HD recorder 23 (as shown in FIGS. 6 and 7), the audio data are assigned to the respective pads 27 and are stored in the audio data storage areas (see FIG. 10B) in the HDD of the HD recorder 23 at the same time. The audio data is then stored at corresponding locations in the pad RAM 16. On the other hand, if the audio data to be assigned to the respective pads 27 are stored in the HDD of the HD recorder 23 (as shown in FIG. 5), the audio data are assigned to the respective pads 27 and are read out from storage positions in the audio data storage areas (see FIG. 10B) in the HDD of the HD recorder 23 at the same time and stored at corresponding locations in the pad RAM 16. In this case, the audio data is inhibited from being double stored in the HDD of the HD recorder 23. This reduces the capacity of the HDD of the HD recorder 23.

The audio data to be assigned to the respective pads 27 are stored in the audio data storage areas in the HDD of the HD recorder 23 as stated above, whereas the trigger lists corresponding to the respective pads 27 are stored in song management data storage areas in the HDD of the HD recorder 23. In a predetermined storage area in the HDD of the HD recorder 23, the audio data storage areas are arranged such that the song number increases after system management data toward the end of the storage area. On the other hand, the song management data storage areas are arranged such that the song number increases from the end to the top. Such arrangement is intended to efficiently use the predetermined storage area having a fixed capacity.

Figure 9:
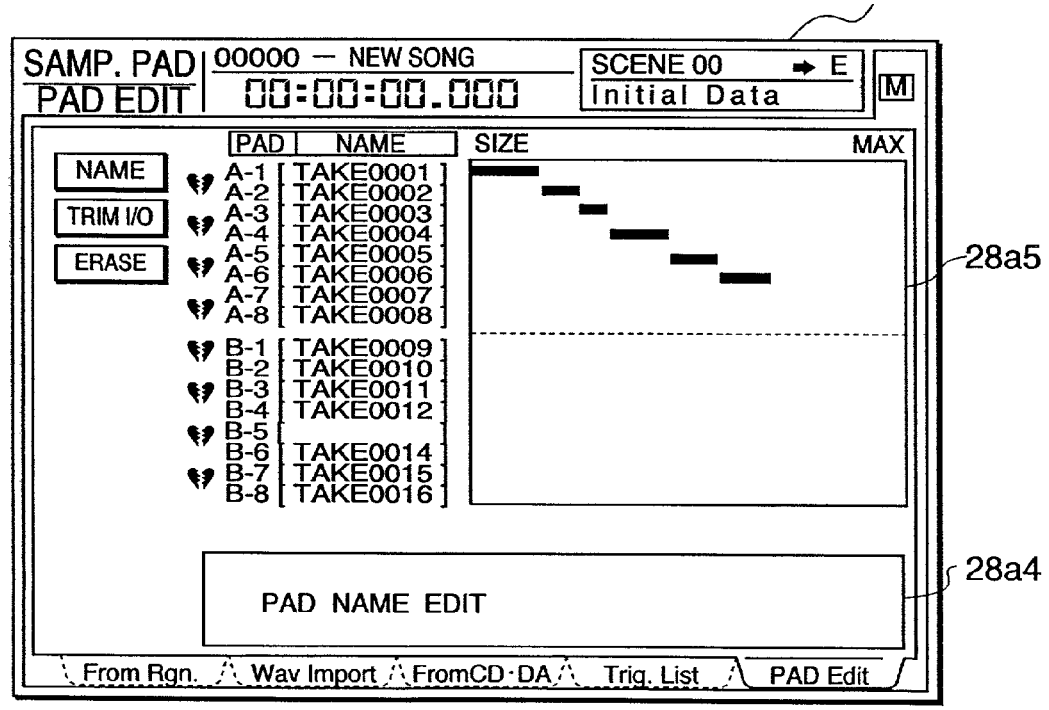
FIG. 9 is a view useful in explaining a pad editing function.

FIG. 9 is a view useful in explaining the (3) pad editing function. The last setup screen is shifted to a setup screen ("PAD EDIT") in FIG. 9 by pressing the fifth key ("F5") among the function keys 26c on the setup screen in any one of FIGS. 5-8 (or setting the cursor to a tag "PAD Edit" on the screen and pressing the enter key 26g).

On this setup screen, i.e. a pad editing screen, it is possible to (1) change the setting of the names assigned to the pads 27, (2) set and change a period of time("TRIM IN") from the start of depression to the start of sounding if the pad 27 is pressed, (3) set and change a period of time ("TRIM OUT") from the start of depression to the start of sounding if the pad 27 is continuously pressed, (4) set and change pairs of pads 27; and (5) erase the assignment when audio data are assigned to the pads 27.

Referring to FIG. 9, to change the setting of the name as mentioned above in (1), the cursor shift key 26f is operated to set the cursor to a button "NAME" and the enter key 26g is pressed. This inverts the display of the button "NAME" (not shown), and displays a setting change area 28a4 for changing the set names of the pads 27. The cursor shift key 26f is then operated to set the cursor to a desired pad 27 (any one of A-1 to B-8), and the enter key 26g is pressed. This displays the name of the desired pad 27 in the setting change area 28a5, and the displayed name is changed e.g. by rotating the jog shuttle 26e. The use of alphanumeric keys would make the input easier. It is possible to adopt another method enabling the easy input.

To set or change the period of time "TRIM IN" or "TRIM OUT" as stated above in (2) or (3), the cursor shift key 26f is operated to set the cursor to a button "TRIM I/O" and the enter key 26g is then pressed. This inverts the display of the button "TRIM I/O" (not shown), and displays the setting change area at the bottom of the screen to indicate that it is possible to set or change the period of time "TRIM IN" or "TRIM OUT". Every time the enter key 26g is pressed, "TRIM IN" and "TRIM OUT" can be designated by toggling. It should be understood, however, that there is no intention to limit to it. For example, a button "TRIM IN" and a button "TRIM OUT" may be provided so that the period of time of "TRIM IN" or "TRIM OUT" can be set or changed when the cursor is set to either one of the two buttons and the enter key 26g is pressed. As stated above, "TRIM IN" means a period of time from the start of depression to the start of sounding in the case where the pad 27 is continuously depressed. According to the present embodiment, the period of time "TRIM IN" and the period of time "TRIM OUT" are designated by the number of data samples. Therefore, if audio data is assigned to the designated pad 27, the total number of samples from the audio data is displayed in the setting change area 28a4. It should be noted that the sizes of audio data assigned to the respective pads 27 are displayed as bars in an area 285a so as to confirm the result of the change in the setting of "TRIM IN" or "TRIM OUT" or to confirm the residual capacity since the total capacity of audio data assigned to the pads 27 is fixed as stated previously.

To set or change pairs of pads 27 as stated above in (4), the cursor is set to a broken heart mark and the enter key 26g is pressed in the illustrated example. This changes the display from the broken heart mark into a heart mark. To the contrary, setting the cursor to a heart mark and pressing the enter key 26g change the display from the heart mark into a broken heart mark. If a heart mark is displayed, the pad 27 of an odd number and the pad 27 of an even number, which are adjacent to each other, cooperate to carry out corresponding operations. Specifically, in the state wherein a heart mark is displayed, a stereo audio signal for the left channel Lch is assigned to the pad 27 of an odd number and a stereo audio signal for the right channel Rch is assigned to the pad 27 of an even number. When one pad in the pair of pads 27 is pressed, the audio signals assigned to the pair of pads 27 are stereophonically reproduced at the same time as if the other pad 27 were also pressed. The assignment of regions to the pads 27 described with reference to FIG. 5 and the creation of the trigger lists described with reference to FIG. 8 are also performed by the paired pads 27 in cooperation with one another.

To erase the assignment of the audio data to the respective pads 27 as stated above in (5), the cursor shift key 26f is operated to set the cursor to the pad number of a pad whose assignment is desired to be erased and the enter key 26g is then pressed. This inverts the display of the pad number (not shown). The cursor shift key 26f is operated in this state to set the cursor to a button "ERASE", and the enter key 26g is pressed. This erases the assignment of the audio data to the pad 27.

Figure 11:
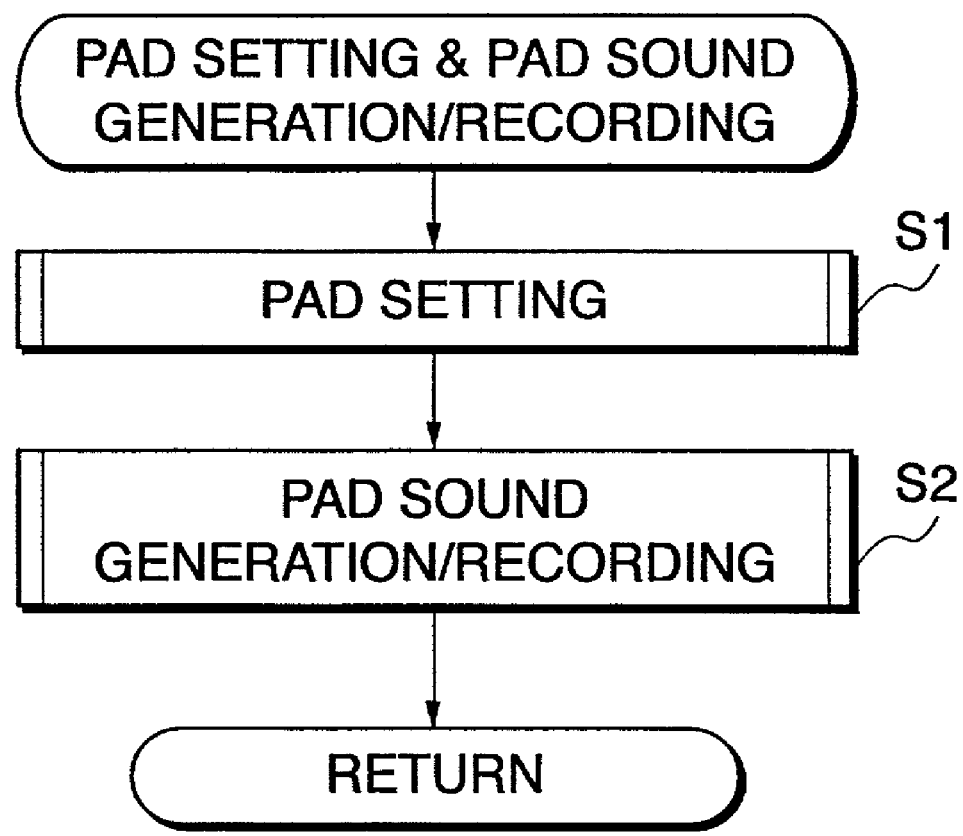
FIG. 11 is a flow chart showing a main routine of the pad setting/pad sound generating and recording process.
Figure 12:
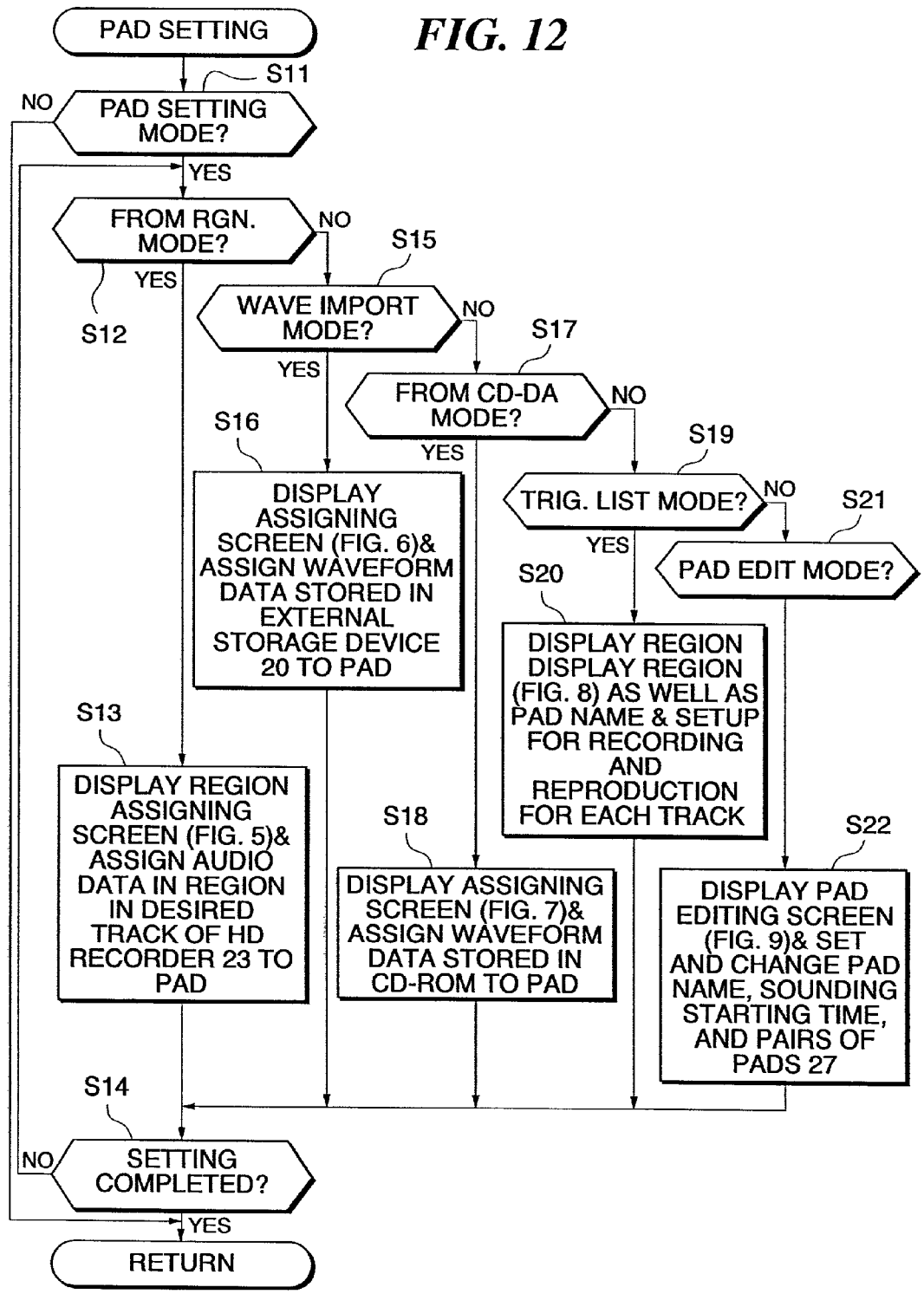
FIG. 12 is a flow chart showing the details of the pad setting/changing process at the step S1 of the main routine in FIG. 11.
Figure 13:
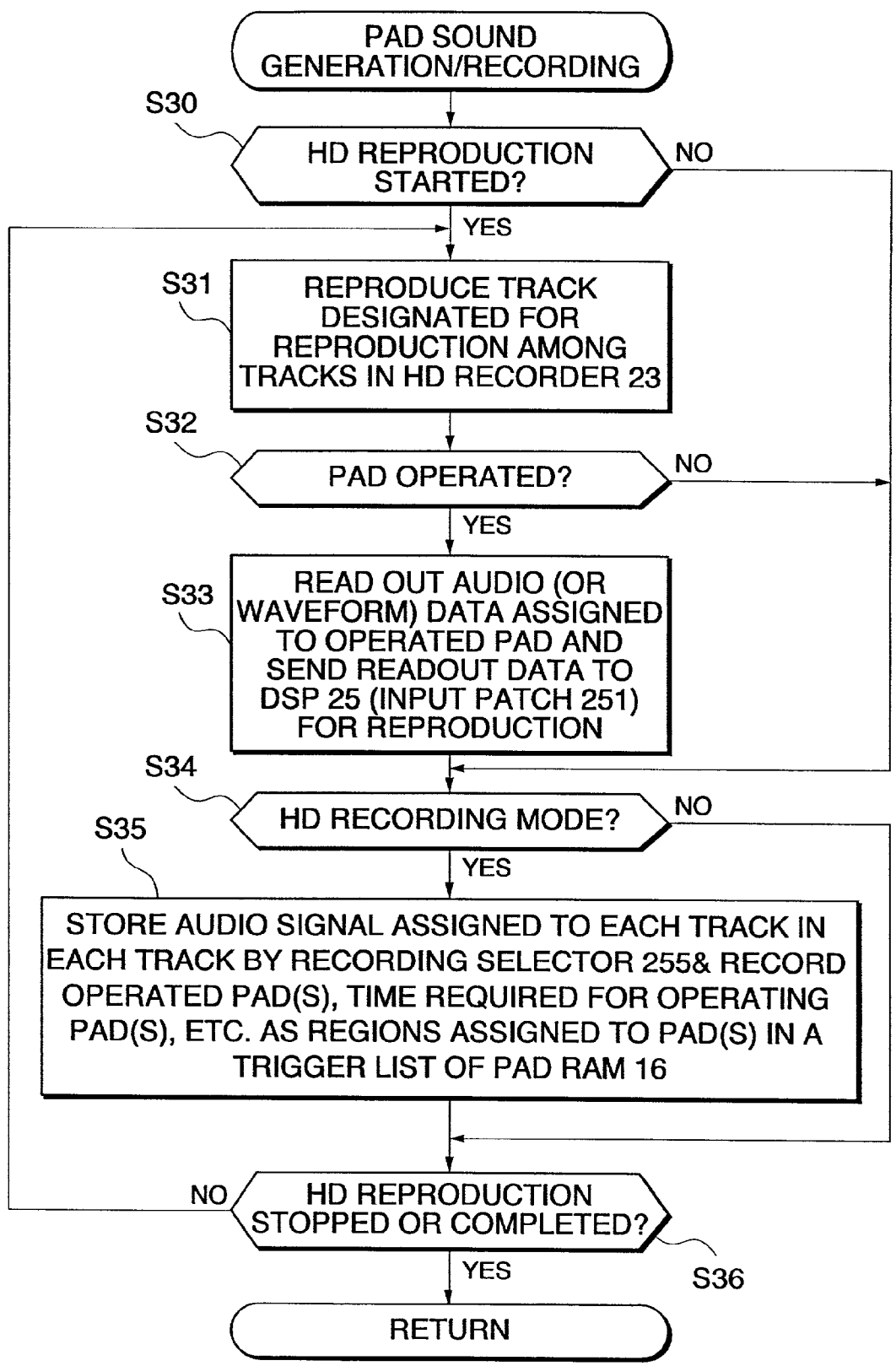
FIG. 13 is a flow chart showing the pad sound generating and recording process executed at the step S2 of the main routine in FIG. 11.

Referring next to FIGS. 11-13, there will be described a pad setting/pad sound generating and recording process that is carried out by the CPU 18.

FIG. 11 is a flow chart showing a main routine of the pad setting/pad sound generating and recording process.

First, the pad setting and changing process described above with reference to the setup screens in FIGS. 5-9 is carried out at a step S1. In a next step S2, the pads 27, which are set and changed in the pad setting and changing process, are operated to carry out the pad sound generating and recording process for generating and recording pad sounds to then terminate the pad setting/pad sound generating and recording process.

FIG. 12 is a flow chart showing the details of the pad setting/changing process at the step S1 of the main routine in FIG. 11.

First, when the edit key 26a in FIG. 3 is operated to set a pad setting mode (step S11), it is determined whether a mode "From Rgn." is set by operating the first key F1 among the function keys 26c (step S12). If the mode "From Rgn." is set, the setup screen in FIG. 5 is shown on the display 28 via the display circuit 14 (step S13). On the setup screen, a region in a desired track of the HD recorder 23 is assigned to any one of pads 27 according to the operation by the user. If the setting on the setup screen in FIG. 5, i.e. if the assignment of regions is competed (step S14), the program returns to the main routine in FIG. 11.

If it is determined at the step S12 that the mode "From Rgn." is not set, it is determined whether a mode "Wave Import" is set by operating the second key F2 among the function keys 26c (step S15). If it is determined that the mode "Wave Import" is set, the setup screen in FIG. 6 is shown on the display 28 via the display circuit 14 (step S16). On this setup screen, waveform data stored in the external storage device 20 are assigned to any one of pads 27 according to the key operations by the user as stated above, and the program then proceeds to the step S14.

If it is determined at the step S15 that the mode "Wave Import" is not set, it is determined whether a mode "From CD_DA" is set by operating the third key F3 among the function keys 26c (step S17). If it is determined that the mode "From CD_DA" is set, the setup screen in FIG. 7 is shown on the display 28 via the display circuit 14 (step S18). On the setup screen, waveform data stored in the CD-ROM are assigned to any one of pads 27 according to the key operations by the user as stated above, and the program then proceeds to the step S14.

If it is determined at the step S17 that the mode "From CD_DA" is not set, it is determined whether a mode "Trig. List" is set by operating the fourth key F4 among the function keys 26c (step S19). If it is determined that the mode "Trig. List" is set, the screen for displaying the pads 27, the names thereof and the region display area 28a3 in FIG. 8 is shown on the display 28 via the display circuit 14 (step S20). The creation of the trigger lists, i.e. the setup for the recording and reproduction of the pads 27 on each track is carried out on this screen according to the key operations by the user, and the program then proceeds to the step S14.

If it is determined at the step S19 that the mode "Trig. List" is not set, it is determined whether a mode "PAD Edit" is set by operating the fifth key F5 among the function keys 26c (step S21). If it is determined that the mode "PAD Edit" is set, the pad editing screen in FIG. 9 is shown on the display 28 via the display circuit 14 (step S22). The names of pads, the sounding starting time ("TRIM IN"), the sounding ending time ("TRIM OUT"), and the pairs of pads 27 are set or changed, and the program then proceeds to the step S14.

FIG. 13 is a flow chart showing the pad sound generating and recording process executed at the step S2 of the main routine in FIG. 11. As stated above, the generation and recording of pad sounds (the reproduction and recording of pads) are performed at the same time as the recording and reproduction of the HD recorder 23.

First, it is determined whether an instruction for starting the reproduction of the HD recorder 23 is given by operating the Play key 26i (step S30). If this instruction is given, a track designated for reproduction is directed is reproduced among the tracks of the HD recorder 23 (step S31). If any one of the pads 27 is operated during the reproduction (step S32), audio data (waveform data) assigned to the operated pad is read out from the pad RAM 16 and is transmitted to the DSP 25 for reproduction (step S33).

On the other hand, if the Play key 26i is not operated at the step S30, if none of the pads 27 is operated at the step S32, or after the execution of the step S33, it is determined whether a HD recording mode is set by operating the REC key 26h (step S34). If the REC key 26h is operated, the recording selector 255 stores audio signals assigned to one or more designated pads 27 on one or more designated tracks of the HD recorder 23, respectively, and records the operating conditions (e.g. the operating time) of the designated pad or pads as the sequence of regions assigned to the pad or pads in a trigger list in the PAD RAM 16. It is then determined whether the reproduction of the HD recorder 23 is stopped or completed (step S36). If the reproduction of the HD recorder 23 is stopped or completed, the program returns to the main routine in FIG. 11. If the reproduction of the HD recorder 23 is not stopped or completed, the program returns to the step S31.

It is to be understood that the object of the present invention may also be accomplished by using a program as software which realizes the functions of the above described embodiment.

Further, it is to be understood that that the present invention may be implemented by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code read out from the storage medium realizes the functions of the above described embodiment, so that the storage medium storing the program code also constitutes the present invention.

The storage medium for supplying the program code may be, for example, a floppy disk, a hard disk, an optical disk, a magneto-optical disk, a CD-ROM, a CD-R, a magnetic tape, a non-volatile memory card, or a ROM. The program code may be supplied from a server computer through other MIDI equipment or communication network.

Further, it is to be understood that the functions of the above described embodiment may be accomplished not only by executing a program code read out by a computer, but also by causing an OS (Operating System) or the like which operates on the computer to perform a part or all of the actual operations based on instructions of the program code.

Further, it is to be understood that the functions of the above described embodiment may be accomplished by writing a program code read out from the storage medium into an expansion board inserted into a computer or a memory provided in an expansion unit connected to the computer and then causing a CPU, etc. provided in the expansion board or the expansion unit to perform a part or all of the actual operations based on instructions of the program code.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A mixing device comprising:
    an input device that inputs a plurality of first audio data;
    a built-in hard disk device that stores a plurality of second audio data;
    an external storage device that stores a plurality of third audio data;
    a plurality of operating members each being disposed to be depressed and having a sensor for detecting the depression;
    an assigning device that assigns at least one from among the plurality of second audio data stored in said built-in hard disk device and/or the plurality of third audio data stored in said external storage device, respectively, to at least one of said plurality of operating members;
    a memory;
    a control device that is responsive to said assigning device assigning the third audio data, respectively, to the at least one of said plurality of operating members, for causing said built-in hard disk device to temporarily store the assigned second audio data and causing said memory to store the assigned third audio data, said control device being further responsive to said assigning device assigning the second audio data, respectively, to the at least one of said plurality of operating members, for reading out the assigned second audio data from said built-in hard disk device and causing said memory to temporarily store the assigned second audio data without double storing the assigned second audio data in said built-in hard disk; and
    a reproducing device that reads out and reproduces the second or third audio data from said memory when the at least one of said plurality of operating members to which the second or third audio data is assigned is detected as being depressed.

2. A mixing apparatus according to claim 1, wherein said operating members are pads.

3. A computer-readable medium encoded with a computer program for causing a computer to execute a method of:
    using an input module to input a plurality of first audio data;
    using a mixing module for the input plurality of first audio data;
    causing a first storing module to store a plurality of second audio data in a built-in hard disk device;
    causing a second storing module to store a plurality of third audio data in an external storage device;
    using an assigning module to assign at least one from among the plurality of second audio data stored in the built-in hard disk device and/or the plurality of third audio data stored in the external storage device, respectively, to at least one of a plurality of operating members each disposed to be depressed and having a sensor for detecting the depression;
    using a controlling module to cause, in response to assigning the third audio data, respectively, to the at least one of said plurality of operating members in said assigning module, the built-in hard disk device to temporarily store the assigned second audio data and causing said memory to store the assigned third audio data, and reading out, in response to assigning the second audio data, respectively, to the at least one of said plurality of operating members in said assigning module, the assigned second audio data from the built-in hard disk device and causing the memory to temporarily store the assigned second audio data without double storing the assigned second audio data in the built-in hard disk; and
    causing a reproducing module to read out and reproduce the second or third audio data from the memory when the at least one of the plurality of operating members to which the second or third audio data is assigned is detected as being depressed.

* * * * *